H. S. CLEVELAND.
COOKING STOVE.
APPLICATION FILED MAR. 26, 1908.
No. 918,826.
Patented Apr. 20, 1909.
2 SHEETS—SHEET 1.
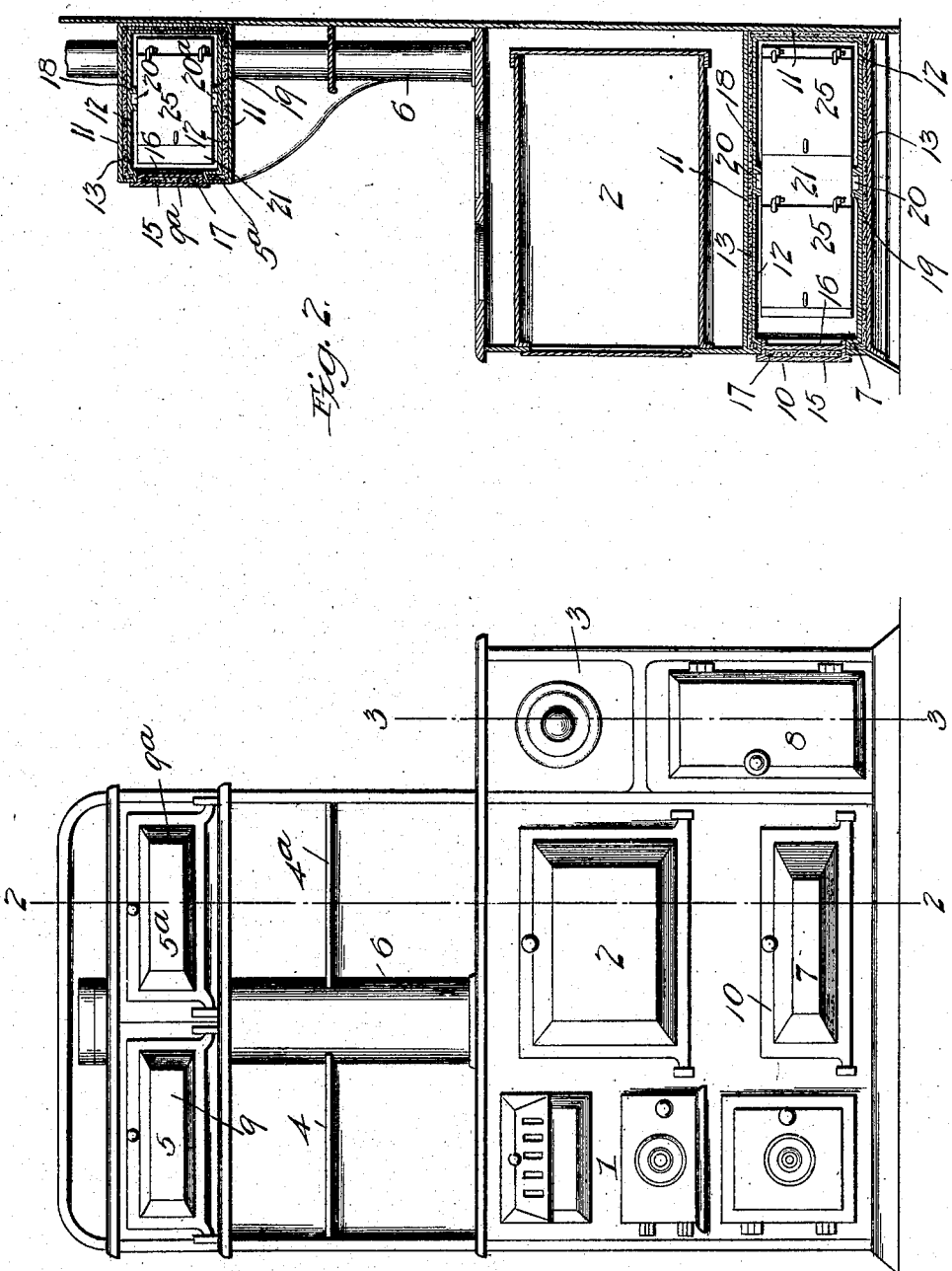

H. S. CLEVELAND.
COOKING STOVE.
APPLICATION FILED MAR. 26, 1908.
918,826.
Patented Apr. 20, 1909.
2 SHEETS—SHEET 2.
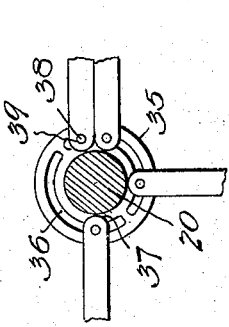
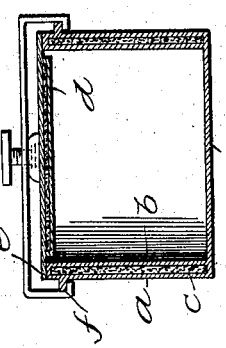
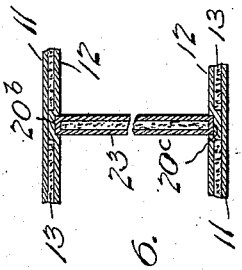
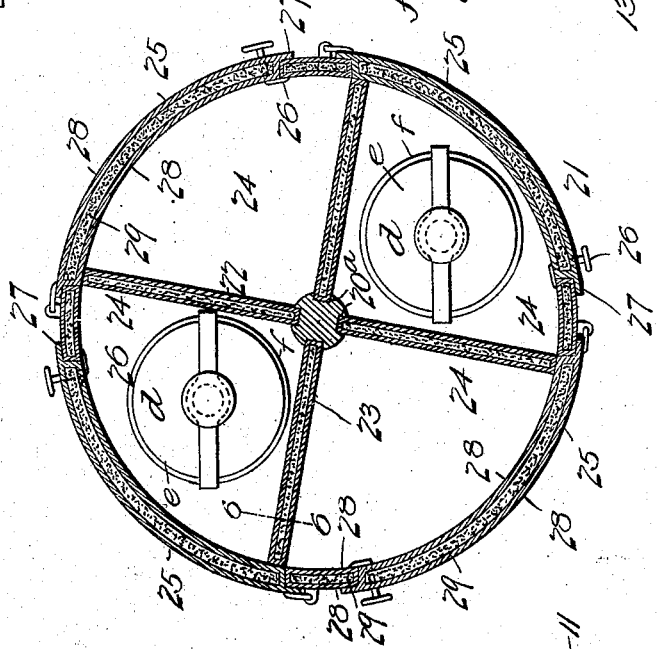
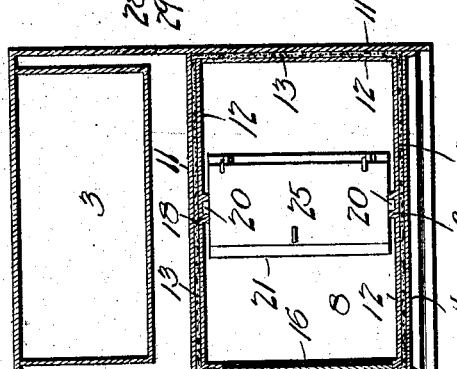
Witnesses
E. O. Crocker
F. O. McCleary
Inventor
Harry S. Cleveland
By T. L. Mosher
Attorney

UNITED STATES PATENT OFFICE.

HARRY S. CLEVELAND, OF FARIBAULT, MINNESOTA, ASSIGNOR OF ONE-HALF TO CHARLES H. ROBENBACH, OF CEDAR FALLS, IOWA.

COOKING-STOVE.

No. 918,826.      Specification of Letters Patent.      Patented April 20, 1909.

Application filed March 26, 1908. Serial No. 423,329.

*To all whom it may concern:*

Be it known that I, HARRY S. CLEVELAND, a citizen of the United States, residing at Faribault, in the county of Rice and State of Minnesota, have invented certain new and useful Improvements in Cooking-Stoves, of which the following is a specification.

This invention relates to cooking stoves, or ranges, and has specially in view improved means whereby the waste spaces thereof are utilized to provide novel type of closets in which the articles to be cooked may be placed after a partial preliminary cooking in the usual manner on the range, to complete their cooking therein, or to be preserved in a heated condition.

With the above and many other objects in view the invention consists in providing a cooking stove or range with a plurality of upper and lower closets which are arranged so that they may be heated by the fire of the stove, or the products of combustion of such fire, said closets being provided with heat insulating walls and doors, which tend to retain the heat, and being also provided with a rotary partitioned container arranged to form a plurality of chambers insulated from one another and from the closet in which it is mounted, and each chamber being arranged so that access may be had to any one of them without permitting any of the others to be cooled by the outside air.

In carrying out the objects set forth above various details of construction may be resorted to, but a preferred and practical embodiment thereof is shown in the accompanying drawing, wherein—

Figure 1 is a front elevation of an ordinary form of cooking range, showing the same provided with the improved upper and lower closets. Fig. 2 is a vertical sectional view taken on the line 2—2 of Fig. 1. Fig. 3 is a vertical sectional view taken on the line 3—3, Fig. 1. Fig. 4 is a transverse sectional view of one of the rotary containers. Fig. 5 is a detail sectional view of a type of cooking utensil especially adapted for use in connection with the present invention. Fig. 6 is a detail sectional view taken on the line 6—6, Fig. 4. Fig. 7 is a detail view of a modified form of mounting for the partitions.

Like reference characters designate corresponding parts.

In the accompanying drawings the invention has been shown applied to an ordinary type of coal burning range having the usual fire compartment 1 at one side, the central oven 2, and the side water reservoir 3. The back of the range is extended upwardly in the usual manner to provide a support for shelves 4—4$^a$, and also for upper closets 5—5$^a$, which are separated from one another by the smoke pipe 6. The oven 2 is arranged sufficiently above the bottom of the stove to leave ample space for a lower central closet 7, and adjoining said closet 7, and beneath the water reservoir 3, additional space is left to provide for another closet 8.

As thus far described, it will be seen that the upper closets 5—5$^a$ are in a position where they will be kept in a highly heated condition through the medium of the products of combustion which pass through the smoke pipe 6, and that the lower central closet 7 is kept in a highly heated condition by being adjoining the fire compartment 1. Therefore it will be understood that said closets 5—5$^a$ and 7 may subserve the functions of ordinary heated ovens. The lower end closet 8 does not become as highly heated as the closets 5—5$^a$ and 7, owing to its being located at the side of the range opposite the fire chamber, and therefore such closet is utilized principally to preserve the warmth in the cooked articles. The upper closets 5—5$^a$ and the lower central closet 7, are preferably each provided with a door 9—9$^a$ and 10 of the well known bottom hinged, or "drop" type, and the lower end closet 8 is preferably provided with a door of the well known side hinged type, although it will be understood that the invention is not limited to such arrangement of doors, as it will be understood that any other type, or types, of doors which will prevent the admission of the cool, outside, air to such closets will fall well within the scope and spirit of the present invention.

Each of the closets 5—5$^a$, 7 and 8 are of the same construction and arrangement of parts and have mounted therein the same type of utensil container, so for convenience, the description thereof will be restricted to the closet and its container as shown in Figs. 2 and 3 of the drawings, although the same reference characters that are used in referring to parts thereof will be applied to the similar parts which appear in the upper and lower side closets. Referring to said Fig. 2 it will be observed that the warming closets are provided with top, end and bottom walls formed of spaced apart metal sheets 11—12 between which is placed a sheet of heat insulating material 13, such as asbestos or the like, and that the doors thereof are similarly formed of outer and inner spaced apart metal plates 15—16 between which heat insulating material 17 is also placed. At the center of the top and bottom of the closets, the metal sheets are provided with outstanding bearings 18—19, which receive the ends of a shaft 20 carrying a rotary utensil container 21. Said utensil container 21 is circular in cross section, as shown in Fig. 4 of the drawings, and is divided transversely by means of vertically arranged partitions 22—23 to form a plurality of triangularly shaped chambers 24, each of which is provided with outwardly opening doors 25 provided with latches 26, and overlapping flanges 27. Said utensil container is in its entirety a closed receptacle, the interior of which is divided into a plurality of independent chambers each being provided with a door, and said container is insulated from the closet in which it is rotatably mounted by means of the double metallic walls 28 between which is interposed the insulating material 29, and the door of each chamber is similarly formed. And it will be observed that each chamber 24 is insulated from the adjoining chamber through the insulating partitions 22 or 23 which are composed of outer sheets of metal and interposed sheets of insulating material.

A prominent and distinctive feature of the invention is in the mounting of the said partitions within the container whereby they may be removed therefrom when it is desired to increase the area of the container. To permit of such removal of the partitions, the shaft 20 is provided with holding grooves 20ᵃ which are arranged vertically and adapted to receive the end of each partition, and the top and bottom of the container has formed therein guiding grooves 20ᵇ—20ᶜ which receive and guide the partitions. By this construction it is possible to remove any one of the said partitions, or all of them, when such a course is necessary to permit of placing large utensils in the container.

In Fig. 7 of the drawings a modified mounting of the partitions is suggested, the same consisting in providing the shaft 20 with upper and lower collars 35 having slots 36 formed therethrough. These collars are so arranged on the shaft that they will permit the rounded ends 37 of the partitions being placed therebetween. And to connect the said partitions to the shaft collars bolts 38 are passed through said slots and through bolt openings 39 formed in the said rounded end of each partition. It will be observed by reference to said Fig. 7 that through the described connection of the partitions with the collars of the shaft, that the partitions may have a rotary movement relatively to said shaft, to swing any one of the partitions adjacent to its adjoining partition and thereby increase the area of the chambers. In said figure one of the partitions has been shown in such position, serving as an example of how the area of the chamber may be increased.

In using the present invention, the articles are first partially cooked on the stove in the usual manner after which they are placed in either the upper or the lower central closets, which closets owing to their proximity to the fire and the smoke pipe, have become highly heated, and which, owing to the formation of their walls with the insulating material therebetween, will retain the heat a long while, even after the fire has been put out in the fire compartment 1. While in these closets the articles will be completely cooked after which, owing to the heat retained in said closet, the articles may be kept warm for a long period. The closet 8 being only warmed by its proximity to the central closet 7 is utilized more especially as a warming closet, in which the cooked articles are placed and kept warm owing to the heat retaining nature of the said closet. While the upper and lower closets have been described as highly heated closets in which the completion of the cooking is performed, it is also to be understood that the same possess valuable properties as warming closets, for it will be obvious that after the same have been thoroughly heated by the stove and its smoke pipe the fire may be put out and the articles placed in said closets, where the contained heat therein will either continue the operation of cooking or preserve the cooked articles in a warm condition for a long period.

It will be understood that by means of the described rotary container each article in its cooking receptacle or utensil is provided with an independent chamber whereby it may be kept separated from the rest of the articles that have been placed therein, and that access may be had to any one of such articles without exposing the articles in any of the other chambers to the cool outside air.

In Fig. 5 of the accompanying drawings a sectional view of a utensil has been shown which is well adapted for use in connection with the present invention. Said utensil has its body formed of two sheets $a$—$b$ of metal between which is interposed a layer of heat insulating material $c$. The lid or cover $d$ is similarly formed and has a thin ledge $e$ which rests upon the top of the body. The said lid may be tightly retained by means of an ordinary form of screw and clamp which engage respectively with the said lid and a flange $f$ formed on the outer surface of the said body. The bottom of the utensil is composed of but one layer of metal $g$, no insulation being used, which permits of the contents of the utensil being quickly cooked owing to the rapid heating of the utensil.

While the invention has been shown applied to a coal burning range, it will of course be understood that the same is not limited to such use, for it will be obvious that the same may be used in connection with any other form of stove or range.

Claims:—

1. A cooking stove provided with a plurality of heat retaining closets, and a horizontally rotatable utensil container mounted in each of said closets and insulated therefrom.

2. A cooking stove provided with a plurality of heat retaining closets, and a horizontally rotatable, vertically partitioned, utensil container mounted in each of said closets and insulated therefrom.

3. A cooking stove provided with a plurality of heat retaining closets, and a horizontally rotatable utensil container mounted in each of said closets, said container being divided into a plurality of chambers insulated from one another.

4. A cooking stove provided with heat retaining closets, a utensil container rotatably mounted in said closets and insulated therefrom, means for partitioning said container to provide a plurality of independent chambers insulated from one another, and independent doors for each of said chambers.

5. The combination in a cooking stove, of a heat retaining closet, and a utensil container rotatably mounted therein, said container being provided with a plurality of independent chambers each provided with doors.

6. The combination in a cooking stove, of a warming closet the top and bottom of which is provided with bearings, a container rotatably mounted in said bearings, said container being insulated from said closet and being provided with insulating partitions whereby the same is divided into a plurality of chambers.

7. A cooking stove provided with a plurality of heat retaining closets, a utensil container rotatably mounted in each of said closets and insulated therefrom, and insulating partitions arranged in said container whereby the same is divided into a plurality of independent chambers insulated from one another.

8. A cooking stove provided with a plurality of heat retaining closets, a utensil container rotatably mounted in each of said closets, said containers being insulated from the closets, and transverse partitions arranged in said containers and adapted to provide a plurality of chambers therein said chambers being insulated from one another.

9. A cooking stove provided with a plurality of heat retaining closets, a utensil container mounted in each of said closets and insulated therefrom, and a plurality of partitions slidingly mounted in said container and adapted to divide the same into independent chambers.

10. A cooking stove provided with a plurality of heat retaining closets, a utensil container rotatably mounted in each of said closets and insulated therefrom, and a plurality of insulating partitions slidingly mounted in said container and adapted to divide the same into a plurality of independent chambers.

11. A cooking stove provided with a plurality of heat retaining closets, a utensil container rotatably mounted in each of said closets and insulated therefrom, transverse partitions slidingly mounted in said container adapted to divide the same into independent chambers, and a door for each of said chambers.

12. A heat retaining closet for cooking stoves provided with insulated walls and door, a shaft rotatably mounted therein, a utensil container carried by said shaft and insulated from said closet, and a plurality of partitions slidingly mounted in said container and adapted to divide the same into a plurality of independent chambers.

13. A heat retaining closet for cooking stoves provided with insulated walls and door, a grooved shaft rotatably mounted therein, a utensil container carried by said shaft and provided with upper and lower guiding grooves, and partitions slidingly mounted in said grooves of the container and adapted to divide the same into a plurality of independent chambers.

14. A heat retaining closet for cooking stoves provided with insulated walls and door, a grooved shaft rotatably mounted therein, a utensil container carried by said shaft and insulated from the closet, said container being provided with upper and lower guiding grooves, and partitions slidingly mounted in said guiding grooves and engaging with the grooves of the shaft to provide independent chambers within said container.

In testimony whereof I affix my signature, in presence of two witnesses.

HARRY S. CLEVELAND.

Witnesses:
J. W. LE COONE,
ROBERT NUE.